(No Model.)  3 Sheets—Sheet 1.

M. CILIK.
MACHINE FOR CUTTING CIRCULAR OBJECTS.

No. 248,916.  Patented Nov. 1, 1881.

Witnesses:
Frank Thomason
F. W. Kasehagen.

Inventor:
Matej Cilik
By Wm H Lotz
Attorney (No Model.) 3 Sheets—Sheet 3.
M. CILIK.
MACHINE FOR CUTTING CIRCULAR OBJECTS.

No. 248,916. Patented Nov. 1, 1881.

Witnesses:
Frank Thomason
F. W. Kasehagen

Inventor:
Matej Cilik
By Wm H Lotz
Attorney

UNITED STATES PATENT OFFICE.

MATEJ CILIK, OF CHICAGO, ILLINOIS.

MACHINE FOR CUTTING CIRCULAR OBJECTS.

SPECIFICATION forming part of Letters Patent No. 248,916, dated November 1, 1881.

Application filed August 25, 1881. (No model.)

*To all whom it may concern:*

Be it known that I, MATEJ CILIK, of Chicago, in the county of Cook and State of Illinois, have invented a certain new and useful Improvement in Machines for Cutting Circular Objects, of which the following is a specification.

This invention relates to wood-working machinery, and more particularly to that class employed for producing a multitude of pieces of like shape and dimensions; and it is my object to provide a machine which is to take the place of a turning-lathe for manufacturing pieces of circular shape that are used for ornamentation, and with which an unskilled hand can cut out such pieces with great rapidity.

For this purpose my invention consists of the devices and combinations of devices, as hereinafter described and specifically claimed.

Figure 1:
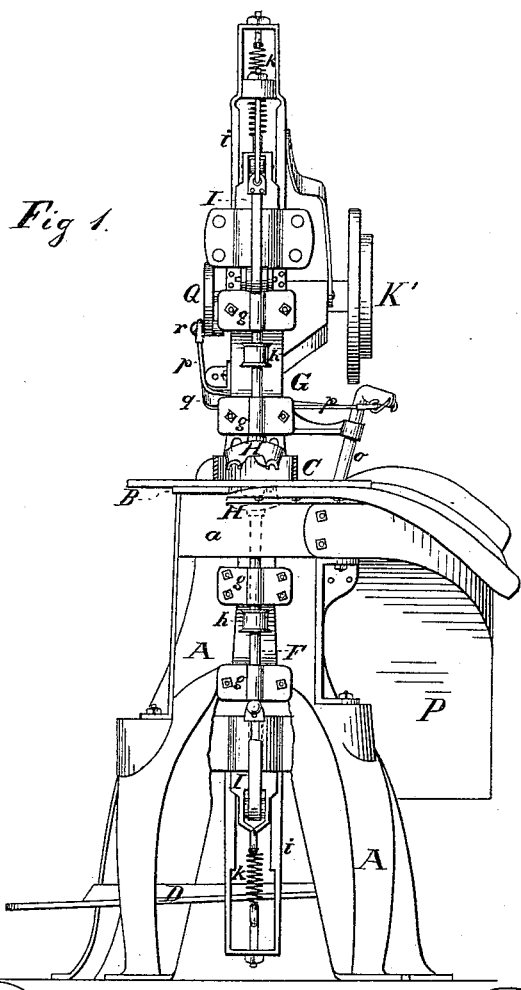
Figure 3:
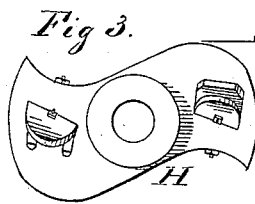
Figure 2:
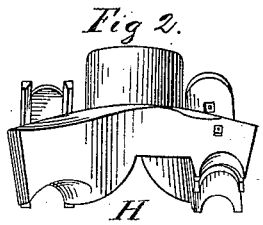
Figure 4:
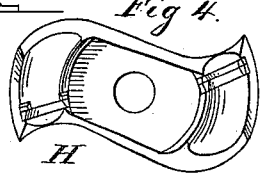
Figure 5:
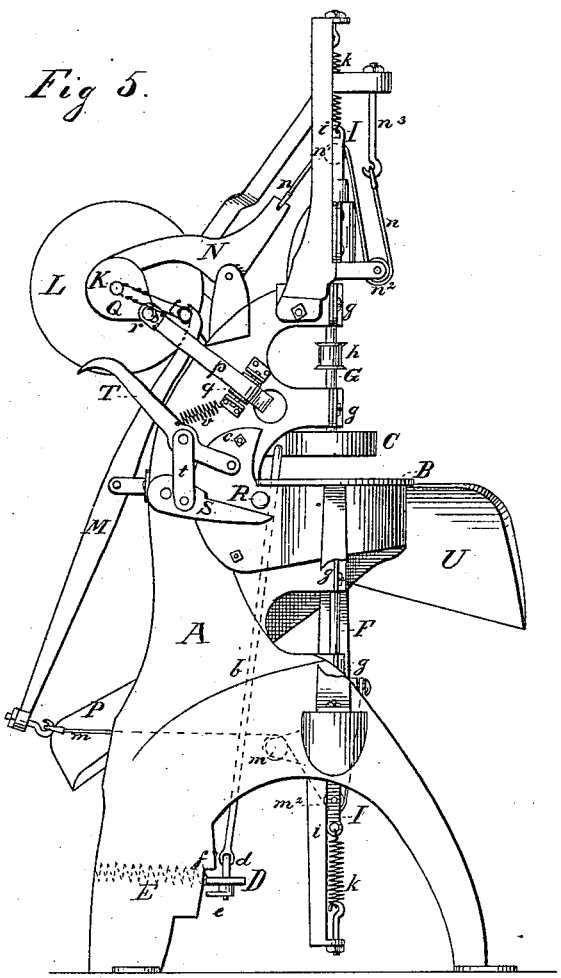
Figures 6, 7:
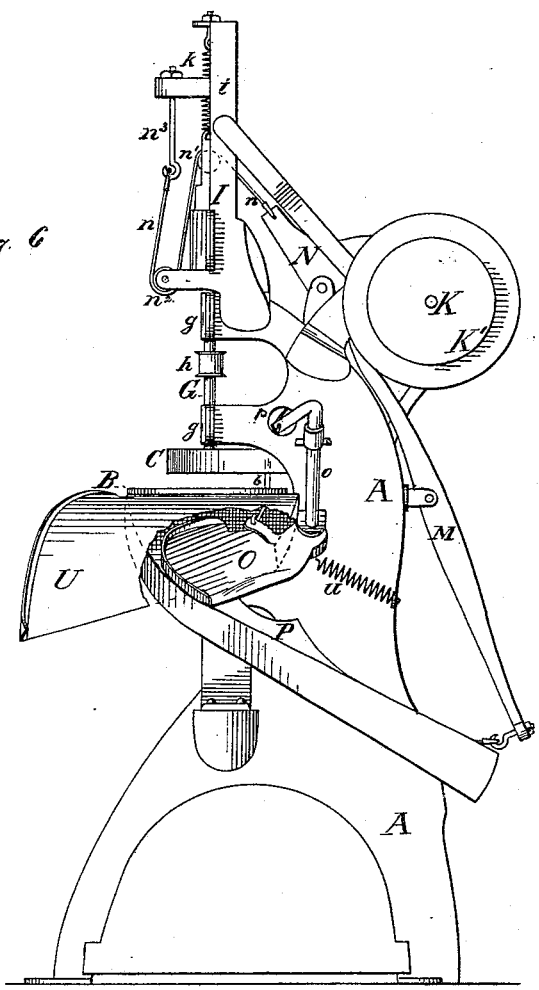

In the accompanying drawings, forming a part hereof, Figure 1 represents a front elevation of the machine; Figs. 2, 3, and 4, side elevation, top, and bottom view of one of the revolving cutter-heads; Fig. 5, an elevation of one side of the machine; Fig. 6, a sectional elevation of the other side of the machine, and Fig. 7 a detached view of the notched bar for locking the wing-plate.

Like letters designate corresponding parts in all the figures.

A denotes the frame, arranged to accommodate the several operating devices. This frame has a suitable support, $a$, for the ring-like plate B, which is removably bolted thereon, so as to be interchangeable for differently-sized objects that are to be manufactured, or it may be made in sections adjustable for that purpose.

C is a clamping-ring, having a rigid arm, the end of which is pivoted in a slotted opening of the frame on a bolt, $c$. This arm at an intermediate point is connected with a rod, $b$, the lower end of which is linked to an eye-bolt, $d$, that is passed through a hole in a lever, D, and is secured by a crank-nut, $e$. This lever D is pivotally connected to one side of the base of the frame A, and reaches across the frame with its projecting end, forming a pedal, which, by depressing it, will draw the clamping down upon the blank to be cut, when said lever is pulled under a step-like shoulder, $f$, by a spring, E, of the frame in such a manner that the blank to be cut is held rigidly in position until it is to be released. This is done by pushing the pedal from under the shoulder, when the lever D is counteracted by a spring, $k$, that will lift it and the clamp-ring again. This clamp-ring is arranged to be interchanged for differently-sized objects, and is to be large enough for the cutter-head to pass into it.

F and G are two spindles vertically in line with each other, and each pivoted in two bearings, $g$, forming parts of the frame, so as to have a vertical sliding motion therein, and upon each spindle F and G is mounted a small flanged pulley, $h$, for driving it by a belt from a vertical drum on a counter-shaft. The ends of these spindles that point toward the working-table are each provided with a cutter-head, H, which is removably secured thereto, so as to be interchanged for a different class of objects to be cut. The extreme ends of these spindles F and G are each inserted into a step bearing or socket of cross-heads I, which move vertically between guides $i$ of the frame, and each of these cross-heads is retracted by a spiral spring, $k$, adjustably secured to the end of the guide by an eyebolt.

K is the driving-shaft, that will regulate the successive operations of the machine, and has a driving-pulley, K'. This shaft is journaled in suitable bracket-bearings forming part of the frame A. A disk, L, is mounted on said shaft K, having a radial slot, into which is adjustably secured a crank-pin, $l$.

M is a vertical lever pivoted to the rear of the frame A, the upper end of which will be pushed forward by the crank-pin $l$ striking it. Through an eye in the lower end of this lever is passed a hook-bolt for catching one end of a belt or rope, $m$, that passes over a pulley, $m'$, on the frame, thence under a pulley, $m^2$, that is pivoted in the cross-head I, and thence it is passed upward, and its end is secured to the frame. By this arrangement, as will be noticed, the vibration of the upper end of the lever M in a forward direction will cause the raising of the lower spindle, F.

M is a horizontal lever pivoted to the frame, the rear end of which will be lifted by the crank-pin $l$, whereby its forward end will be depressed. To the forward end of this lever is connected the end of a rope or belt, $n$, which is passed over a small pulley, $n'$, that is pivoted in the cross-head I; thence it is passed downward under a pulley, $n^2$, on the frame, and thence it is passed upward, and its end is connected to an eyebolt, $n^3$, at the upper front end of the machine. By this arrangement the upper spindle, G, will be pushed downward by the crank-pin $l$ striking the lever N.

Upon a crank-shaft, $o$, that is pivoted in suitable brackets at one side of frame A, and stands in an inclined, nearly vertical, position, is secured a wing-plate, O. This plate O is intended to turn under and form a false bottom for the working-table, for receiving the finished pieces, and then delivering them, one by one, upon a chute, P. For this purpose the end of the crank of the shaft $o$ is coupled to the end of a belt or cord, $p$, which is passed horizontally through an opening in the frame, thence over a pulley, $q$, that is pivoted against the frame, and thence up and backward, where its other end is connected to a crank-pin, $r$, on a crank, Q, which is mounted upon the extreme end of shaft K. The plate O is swung under the plate B by the rotation of the crank-pin $r$, and is retained in that position by a rod, R, guided in the frame and having a hook end by which it is connected to the plate O. This rod R has a notch, $s$, which notch will drop over the edge of a latch, S, that is pivotally connected against the side of the machine, and an arm, T, is also pivotally secured to the side of the machine, so that its end will be struck and depressed by the crank-pin $l$ of disk L, and is connected with the latch S by a link, $t$. In this manner the depression of the arm T by the rotation of the crank-pin $l$ will also depress the latch so that it will be removed from the notch $s$ of rod R, when a spiral spring, $u$, will pull the wing-plate O from under the plate B, which will thereby throw out the finished article upon the chute P. A spring, $v$, will raise the arm T and latch S again after each depression. A chute, U, will carry off the waste material.

The cutter-heads H are each made in the shape of an S, with a hub in the center for securing it to its spindle, and with angular tapering slots in the wings that form the beds for the bit-irons. Each bit-iron has a break-iron attached to insure a smooth cutting action, and is secured by a wedge, the same as in a cabinet-maker's plane. The bit on one side of the cutter-head has plowing-points for cutting annular channels, and the other one is the routing-bit for shaping the object.

The cutter-head, as shown in the drawings, is for cutting rings out of a board used for composing chain-like ornamentations. The top and bottom cutters, as secured to spindles F and G in this machine for that purpose, are both alike, and will alternately shape the bottom and top sides of the ring before it is separated from the blank. The cutter-spindles F and G are both continuously rotated at a high speed, while the shaft K is to have an intermittent motion, and is to be arranged with a clutch that automatically will uncouple the driving-pulley after each single and complete revolution, when the operator, after adjusting and clamping the blank, will couple it again by a treadle or lever.

The operation of the machine is as follows, to wit: A blank having been placed upon plate B, the clamp-ring C is brought down to bear upon said blank and hold it firmly. Now, the shaft K being thrown in gear, the crank-pin $l$ will first be struck, whereby the lower spindle, F, is pushed upward, and its cutter-head will be brought in contact with the blank and will shape the lower half of the object, and as soon as the said crank-pin $l$ has passed and released the end of the lever the spindle F will drop again. Next, the crank-pin $l$ will strike the lever N to push the spindle G downward with its cutter-head, which will cut the upper face of the object, and the crank-pin $r$ simultaneously therewith will swing the wing-plate O under the plate B for receiving the now finished object, said wing-plate being held by the lock-bar R and latch S until the crank-pin $l$ on its further course strikes the arm T to release the wing-plate O again, which now swings sidewise and delivers the finished object upon the chute P. After the crank-pin $l$ has passed the arm T, and before it meets again the lever M, the driving-pulley K' is to be automatically thrown out of gear, when the shaft K will stop turning. Now the operator will release the clamp-ring C, will put under a new blank, clamp it again, and throw the shaft K into gear, when the several operations will be repeated in the succession described.

What I claim as my invention is—

1. In a machine for cutting circular objects, the plate B and clamp-ring C, in combination with the vertically-sliding spindles F and G, having cutter-heads H, and the wing-plate O, all of which being arranged to be in successive operation, substantially in the manner set forth.

2. In a machine for cutting circular objects, the combination of plate B and clamp-ring C with the vertically-sliding spindles F and G, having cutter-heads H and pulleys $h$, crank-pin $l$, levers M N, pulleys $m'$ $m^2$ $n'$ $n^2$, belts $m$ and $n$, cross-heads I, and springs $k$, all constructed and arranged substantially as and for the purpose described and shown.

3. In a machine for cutting circular objects, in combination with the plate B and the automatically-sliding cutter-head spindles F and G, the wing-plate O, secured upon crank-shaft $o$, that is connected to crank-pin $r$ by a belt or rope, $p$, the same being arranged to operate substantially in the manner set forth.

4. In a machine for cutting circular objects, in combination with plate B and vertically-sliding cutter-head spindles F and G, that are automatically brought into operation by a crank-pin, *l*, on shaft K, the wing-plate O, secured to crank-shaft *o*, and operated from a crank-pin, *r*, on shaft K, and a notched rod, R, connected to such wing-plate and engaging with a latch, S, and of an arm, T, that is connected to the latch S by a link, *t*, and is operated by a crank-pin, *l*, on shaft K, all of which being constructed and arranged to operate substantially in the manner set forth.

MATEJ CILIK.

Witnesses:
E. H. FROMMANN,
F. W. KASEHAGEN.